(12) United States Patent
Min et al.

(10) Patent No.: US 10,186,082 B2
(45) Date of Patent: Jan. 22, 2019

(54) ROBUST MERGE OF 3D TEXTURED MESHES

(71) Applicant: Magic Leap, Inc., Plantation, FL (US)

(72) Inventors: Jianyuan Min, Santa Clara, CA (US); Xiaolin Wei, Fremont, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 15/467,851

(22) Filed: Mar. 23, 2017

(65) Prior Publication Data

US 2017/0301133 A1    Oct. 19, 2017

Related U.S. Application Data

(60) Provisional application No. 62/322,081, filed on Apr. 13, 2016.

(51) Int. Cl.
  *G06T 17/20*    (2006.01)
  *G06T 15/50*    (2011.01)
  *G06T 15/04*    (2011.01)

(52) U.S. Cl.
  CPC .......... *G06T 17/205* (2013.01); *G06T 15/04* (2013.01); *G06T 15/503* (2013.01)

(58) Field of Classification Search
  CPC .................................................. G06T 17/00
  See application file for complete search history.

(56) References Cited

U.S. PATENT DOCUMENTS

| | | | |
|---|---|---|---|
| 6,281,904 B1 * | 8/2001 | Reinhardt | G06T 15/04 345/582 |
| 8,289,322 B1 * | 10/2012 | Staten | G06T 17/205 345/423 |
| 9,147,279 B1 | 9/2015 | Bruce et al. | |
| 2004/0164982 A1 * | 8/2004 | Fujiwara | G06T 17/205 345/419 |
| 2004/0169663 A1 * | 9/2004 | Bernier | G06T 15/04 345/629 |
| 2005/0017987 A1 * | 1/2005 | Horita | G06T 17/20 345/629 |
| 2005/0062737 A1 * | 3/2005 | Wang | G06T 15/205 345/419 |
| 2005/0128195 A1 | 6/2005 | Houston et al. | |
| 2007/0132757 A1 * | 6/2007 | Hassner | G06T 17/20 345/420 |

(Continued)

OTHER PUBLICATIONS

Turk et al., "Zippered Polygon Meshes from Range Images", 1994.*

(Continued)

*Primary Examiner* — Phong Nguyen
(74) *Attorney, Agent, or Firm* — Kilpatrick Townsend & Stockton LLP

(57) ABSTRACT

A method of merging 3D meshes includes receiving a first mesh and a second mesh; performing spatial alignment to register the first mesh and the second mesh in a common world coordinate system; performing mesh clipping on the first mesh and the second mesh to remove redundant mesh vertices; performing geometry refinement around a clipping seam to close up mesh concatenation holes created by mesh clipping; and performing texture blending in regions adjacent the clipping seam to obtain a merged mesh.

21 Claims, 13 Drawing Sheets

(7 of 13 Drawing Sheet(s) Filed in Color)

(56) References Cited

U.S. PATENT DOCUMENTS

| | | | |
|---|---|---|---|
| 2008/0021586 A1 | 1/2008 | Schillen et al. | |
| 2008/0303840 A1 | 12/2008 | Zhou et al. | |
| 2009/0002376 A1 | 1/2009 | Xu et al. | |
| 2009/0219280 A1* | 9/2009 | Maillot | G06T 15/04 345/419 |
| 2012/0203512 A1 | 8/2012 | Shahpar et al. | |
| 2013/0300734 A1* | 11/2013 | Schmidt | G06T 17/20 345/419 |
| 2013/0300736 A1* | 11/2013 | Schmidt | G06T 19/20 345/419 |
| 2013/0307848 A1 | 11/2013 | Tena et al. | |
| 2013/0329020 A1 | 12/2013 | Kriveshko et al. | |
| 2014/0063038 A1* | 3/2014 | Kikuta | G06F 17/5018 345/582 |
| 2014/0098090 A1* | 4/2014 | Schmidt | G06T 17/20 345/419 |
| 2014/0132602 A1 | 5/2014 | Raghoebardayal et al. | |
| 2016/0027200 A1* | 1/2016 | Corazza | G06T 13/40 345/420 |

OTHER PUBLICATIONS

Zhou et al., "Mesh Quilting for Geometric Texture Synthesis", 2006.*

Marras et al., "Controlled and Adaptive Mesh Zippering", 2010, DBLP Conference Paper, pp. 1-8.*

Brandao et al., "Joint Alignment and Stitching of Non Overlapping Meshes", 2012, Proceedings of the IEEE/RSJ International Conference on Intelligent Robots and Systems (IROS), pp. 1-6.*

Notification of Transmittal of the International Search Report and the Written Opinion of the International Searching Authority, or the Declaration; International Search Report and Written Opinion of the International Searching Authority for International Patent Application No. PCT/US2017/024273 dated Jun. 1, 2017, 18 pages.

* cited by examiner

US 10,186,082 B2

ROBUST MERGE OF 3D TEXTURED MESHES

CROSS-REFERENCES TO RELATED APPLICATIONS

This application claims the benefit of U.S. Provisional Patent Application No. 62/322,081, filed on Apr. 13, 2016, the contents of which is incorporated by reference in its entirety.

FIELD OF THE INVENTION

The present invention relates generally to computerized three-dimensional (3D) mesh reconstruction, and more particularly, to an automatic approach for merging two or more 3D textured meshes into one textured mesh.

BACKGROUND

A textured mesh is a common representation of 3D geometric shapes. It has been widely used in many graphics applications, including virtual reality, scientific visualization, 3D filming, 3D gaming, and the like. A wide variety of techniques have been introduced to reconstruct meshes from 3D scans. However, creating accurate large and complex meshes from 3D scans can be tedious and labor intensive. It is often done manually by aligning, editing, and combining smaller meshes from multiple 3D scans. Therefore, there is a need in the art for improved methods and systems that enable the robust merging of multiple meshes into a large and complex 3D textured model.

SUMMARY

According to one embodiment, a method of merging 3D meshes includes receiving a first mesh and a second mesh; performing spatial alignment to register the first mesh and the second mesh in a common world coordinate system; performing mesh clipping on the first mesh and the second mesh to remove redundant mesh vertices; performing geometry refinement around a clipping seam to close up mesh concatenation holes created by mesh clipping; and performing texture blending in regions adjacent the clipping seam to obtain a merged mesh.

According to another embodiment, a method of merging 3D textured meshes includes receiving a first mesh and a second mesh; identifying an overlapping region where the first mesh and the second mesh overlap; identifying a bounding box of the overlapping region that contains the overlapping region; and for each respective vertex of the first mesh within the bounding box, searching for a corresponding closest vertex of the second mesh, thereby establishing a plurality of matching pairs. Each matching pair includes the respective vertex of the first mesh and the corresponding closest vertex of the second mesh. The method further includes, for each matching pair of the plurality of matching pairs: estimating a first normal consistent connected group (NCNG) of the respective vertex of the first mesh and a second NCNG of the corresponding closest vertex of the second mesh; upon determining that a ratio between an area of the first NCNG and an area of the second NCNG is greater than a first predetermined threshold, classifying the respective vertex of the first mesh and the corresponding closest vertex of the second mesh as a false matching pair; and removing the false matching pair from the plurality of matching pairs. The method further includes determining a rigid transformation to be applied to the first mesh so as to minimize a distance between a respective vertex of the first mesh and a corresponding closest vertex of the second mesh in each matching pair of the plurality of matching pairs; and applying the rigid transformation to the first mesh to obtain a transformed first mesh. The method may further include performing mesh clipping along a first clipping seam on the transformed first mesh and along a second clipping seam on the second mesh to remove redundant mesh vertices in the overlapping region; and performing geometry refinement around the first clipping seam and the second clipping seam to close up mesh concatenation holes created by mesh clipping.

BRIEF DESCRIPTION OF THE DRAWINGS

The patent or application file contains at least one drawing executed in color. Copies of this patent or patent application publication with color drawings will be provided by the Office upon request and payment of the necessary fee.

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF SPECIFIC EMBODIMENTS

Figure 1:
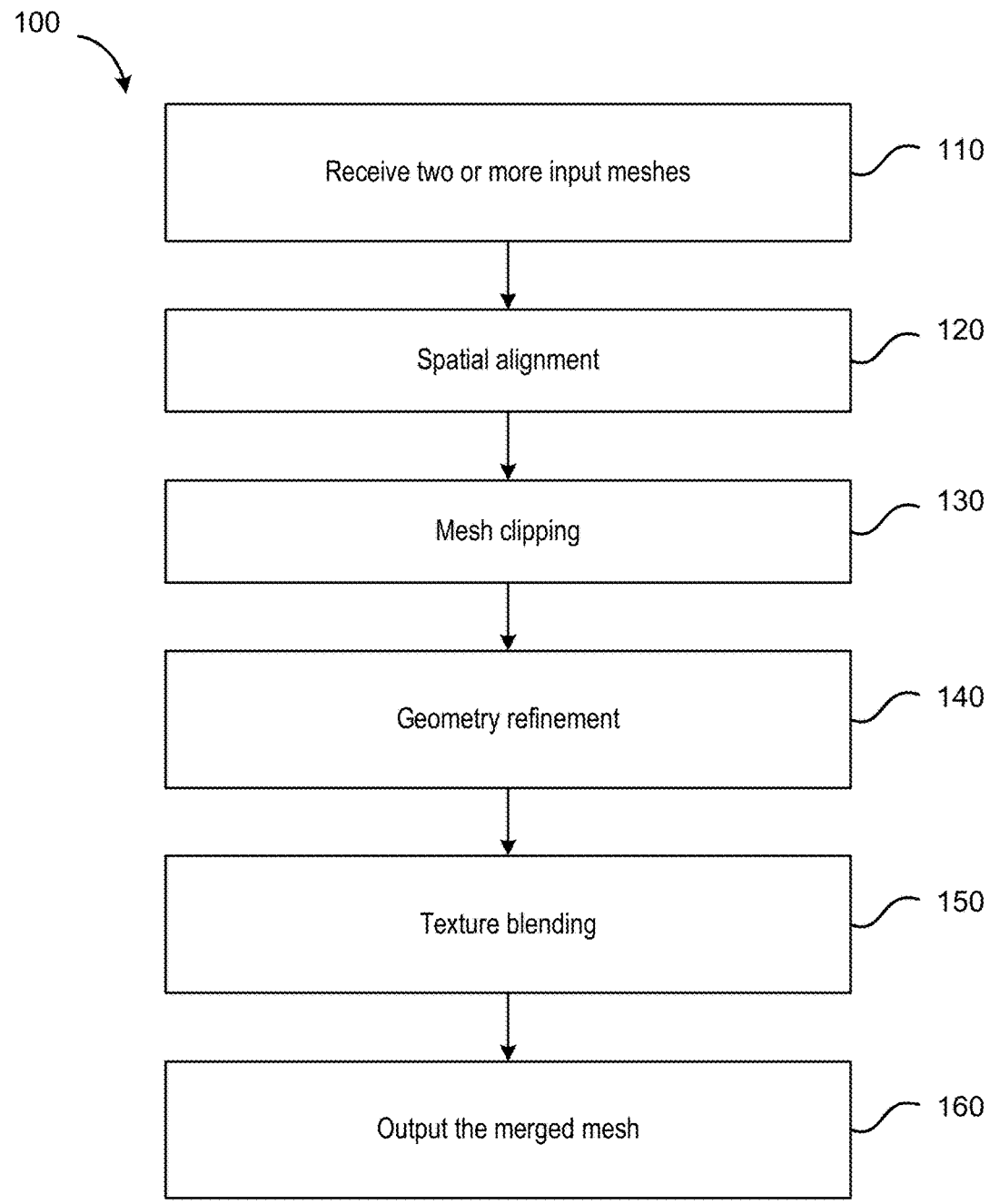
FIG. 1 is a simplified flowchart illustrating a method of merging two or more 3D meshes, according to some embodiments.

Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the disclosure. Thus, embodiments of the present disclosure are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying claims present elements of the various steps in a sample order, and are not meant to be limited to the specific order or hierarchy presented.

The present disclosure relates generally to methods of merging three-dimensional (3D) meshes. More specifically, some embodiments of the present disclosure relate to an automatic approach for robustly merging two or more 3D textured meshes into one large 3D textured mesh. According some embodiments, a 3D mesh may include a polygon mesh. A polygon mesh is a collection of vertices, edges and faces that defines the shape of a polyhedral object in 3D computer graphics and solid modeling. The faces of the polygon mesh may include triangles (triangle mesh), quadrilaterals, or other convex polygons. The faces may also include concave polygons, polygons with holes, and spiral shapes.

When performing 3D scanning of a large area, sections of the area may be individually scanned to create multiple meshes, where each mesh can represent a respective part of the area being scanned. For example, when scanning a building, each individual room as well as sections of hallways in the building may be scanned individually to create multiple meshes. The sections covered by the individual scans may overlap with each other in certain regions. For example, a scan of a room may overlap with a scan of a hallway in an area adjacent to the entrance to the room. Embodiments of the present disclosure may provide methods of computerized merging of multiple meshes into one large mesh.

In some embodiments, when there are a number of input meshes to be merged into a large mesh, the input meshes may be merged sequentially in the order of their sizes. For example, the size of a mesh may be measured in terms of a volume of its bounding box. A bounding box may be defined as a smallest rectangular 3D space that contains the mesh. In some embodiments, the input meshes can be sorted to obtain a sequence in descending order of mesh sizes: $\{M_0, M_1, \ldots, M_k, \ldots, M_n\}$ where $M_k$ is the mesh with the k-th largest volume. The merging process may start with the mesh of the largest size: $M=M_0$. The largest mesh $M_0$ may be sequentially merged with other meshes in the sequence to obtain a current merged mesh: $M=\text{merge}(M, M_k)$ $\{k=0, 1, 2 \ldots n\}$. For instance, the largest mesh $M_0$ can be merged with the second largest mesh $M_1$ to obtain a merged mesh $M=\text{merge}(M_0, M_1)$; then M is merged with the third biggest mesh $M_2$ to obtain a new merged mesh $M=\text{merge}(M, M_2)$; and so on and so forth. For illustration purposes only, the following will describe the process of merging two meshes as an example to explain the merging process. It should be understood that embodiments of the present disclosure are not limited to merging only two meshes, and can be applied to merging any number of meshes.

FIG. 1 is a flowchart illustrating a method 100 of merging two or more 3D meshes according to one embodiment. The method 100 may include the following steps: receive two or more input meshes (110); spatial alignment (120); mesh clipping (130); geometry refinement (140); texture blending (150); and output a merged mesh (160). Some of these steps may be optional. As discussed above, the received meshes may be three-dimensional (3D) and may include components based on triangles (triangle mesh), quadrilaterals, or other convex polygons. Although triangle meshes are discussed herein, embodiments of the present disclosure are not limited to triangle meshes. The method 100 may be implemented by a computer system including a processor and a non-transitory computer-readable storage medium storing instructions.

In the step of spatial alignment (120), the two (or more) input meshes may be accurately aligned with respect to each other by a rigid transformation (e.g., a rotation and translation transformation). The two input meshes may be initially aligned by a user as an approximate starting point for the subsequent spatial alignment performed by the system. The system may identify overlapping regions between the two meshes and densify the overlapping regions. Then the rigid transformation can be optimized by the system to accurately align the two meshes in 3D space.

To achieve high quality merging, mesh-clipping may be applied to automatically clip off geometrically redundant triangles in the overlapping regions. In the step of mesh clipping (130), clipping in a voxelized volume that contains both meshes (i.e., in the overlapping regions) may be applied. The mesh clipping may be subject to the following constraints: (1) intersection constraints (e.g., mesh clipping may be applied where the meshes intersect); (2) boundary constraints (e.g., mesh clipping may be applied farther away from mesh boundaries); and (3) texture quality constraints (e.g., mesh clipping may be performed on triangles whose textures include little color features).

In the step of geometry refinement (140), the clipped meshes may be locally refined for better geometry so as to create seamless and smooth transitions from one mesh to another along a clipping boundary, which may be referred herein as a "clipping seam." After the step of mesh clipping (130), small holes may be produced around a clipping seam. A geometry refinement algorithm can "grow" or extend the clipped meshes along a clipping seam to create small merging bands. By "growing" the clipped meshes along a clipping seam, the mesh components within the merging bands may be locally adjusted to close up the clipping holes. The geometry refinement may produce a continuous (e.g., watertight) geometrical transition along the clipping seam.

Color inconsistencies can exist in the mesh concatenation areas, which may appear as visual artifacts in the resulting mesh. In the step of texture blending (150), color textures in the mesh concatenation areas can be blended to produce visually smooth transitions. This step of texture blending (150) aims to mix the colors from different mesh textures and gradually change blending weights in transition areas. A final merged mesh after the steps of 120, 130, 140, and 150 may then be output (160).

The steps 120, 130, 140, and 150 of the method 100 for merging 3D meshes illustrated in FIG. 1 are described in further detail below.

A. Spatial Alignment

Figure 2:
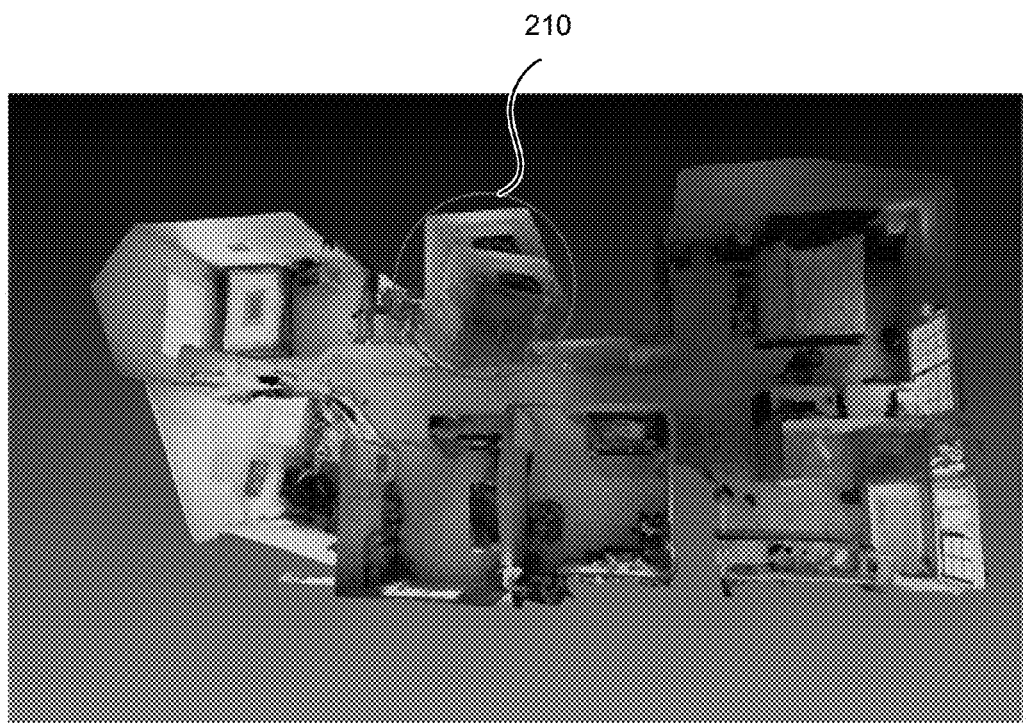
FIG. 2 illustrates images of two meshes, according to one embodiment.

To accurately merge two meshes, the two meshes may need to be registered correctly in concatenation regions in a 3D space. The two input meshes may result from different scans, and therefore may have unrelated orientation and translation. FIG. 2 illustrates images of two meshes, according to one embodiment. The two meshes include images of an interior of a house. The two meshes overlap in region 210 which includes a staircase in the house. As illustrated, the two meshes are misaligned with respect to each other in the overlapping region 210.

A spatial alignment algorithm may find a rigid transformation to register a first mesh (which may be referred to as a source mesh) with respect to a second mesh (which may be referred to as a target mesh), so that their corresponding regions may overlap correctly. Therefore, the basic issues may be formulated as how to establish local correspondence at which the two meshes should overlap, and how to obtain a rigid transformation matrix to translate and rotate the first mesh so as to be registered with respect to the second mesh.

According to some embodiments, the spatial alignment algorithm may be based on iterative closest point (ICP) and spurious triangle detection. An ICP algorithm is an algorithm used in aligning three dimensional models given an initial guess of a rigid transformation. In the ICP algorithm, a first mesh, the target mesh, is kept fixed, while a second mesh, the source mesh, is transformed (combination of translation and rotation) to best match the target mesh. The ICP algorithm iteratively revises the transformation needed to minimize an error metric, usually the distance from the source mesh to the target mesh.

Figure 3:
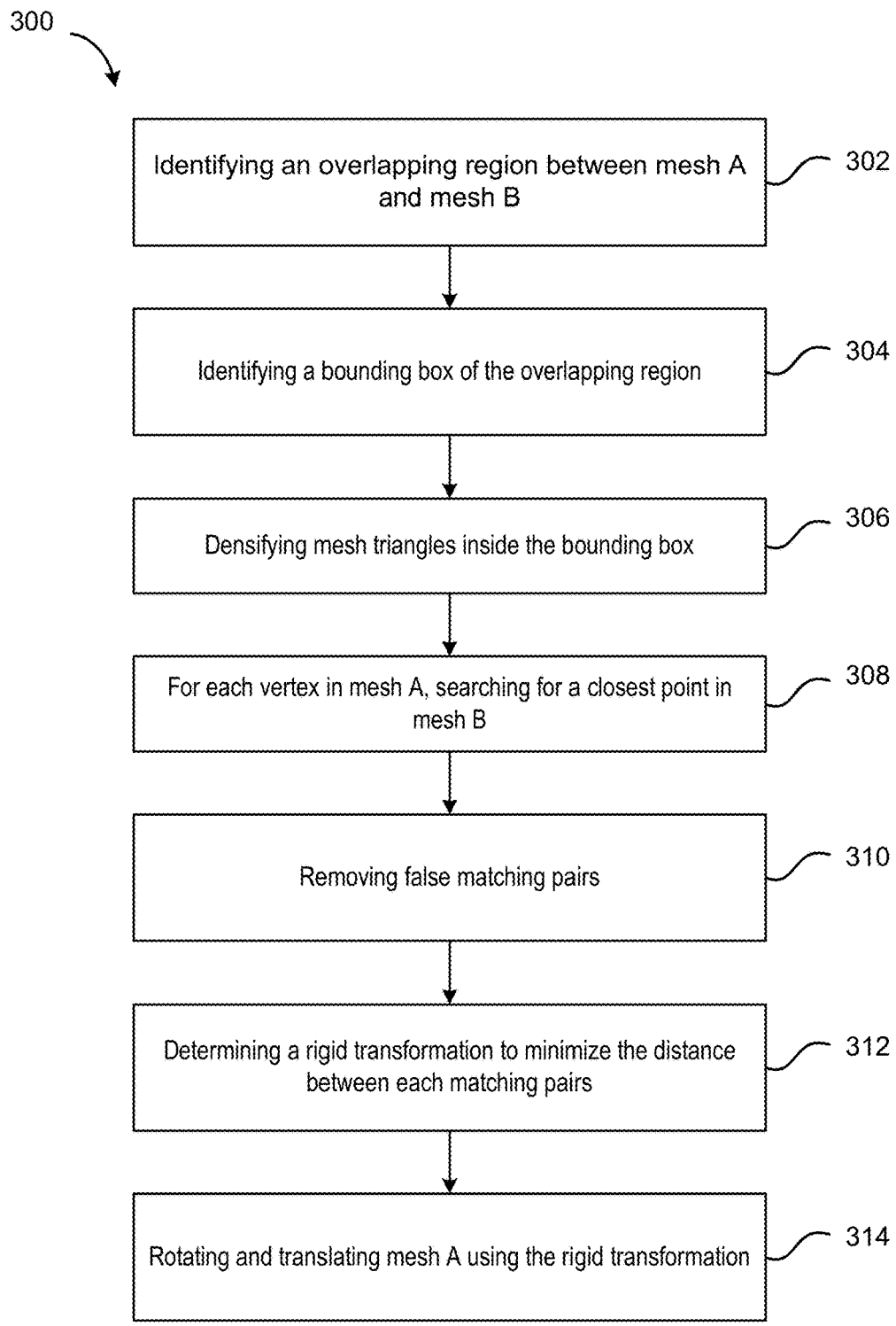
FIG. 3 is a flowchart illustrating a method of performing spatial alignment between two meshes, according to one embodiment.

FIG. 3 is a flowchart illustrating a method 300 of spatial alignment between two meshes according to one embodiment. A first mesh of the two meshes may be referred herein as mesh A, and a second mesh of the two meshes may be referred herein as mesh B. Each of mesh A and mesh B may include a set of mesh triangles that are connected by their common edges or corners. Each triangle may be defined by three vertices at the corners of the triangle.

The method 300 can include identifying an overlapping region between mesh A and mesh B (302); and identifying a bounding box of the overlapping region (304). A bounding box may be defined as a 3D rectangular space that contains the overlapping region. In some embodiments, identifying the bounding box may include identifying an initial bounding box that can be a smallest 3D rectangular space that contains the overlapping region, and then scaling the initial bounding box with a size factor to obtain a more relaxed bounding box. The relaxed bounding box may have a larger volume than the initial bounding box. For example, the initial bounding box may be scaled by a size factor of 2.0 to obtain the relaxed bounding box.

The method 300 can further include densifying the mesh triangles in mesh A and mesh B inside the bounding box (306) by an edge split, to obtain two dense point clouds, which include a set of densified mesh vertices for mesh A $\{V_A\}$, and a set of densified mesh vertices for mesh B $\{V_B\}$. The step of densifying the mesh triangles inside the bounding box (306) may be optional in some embodiments.

Figure 4A:
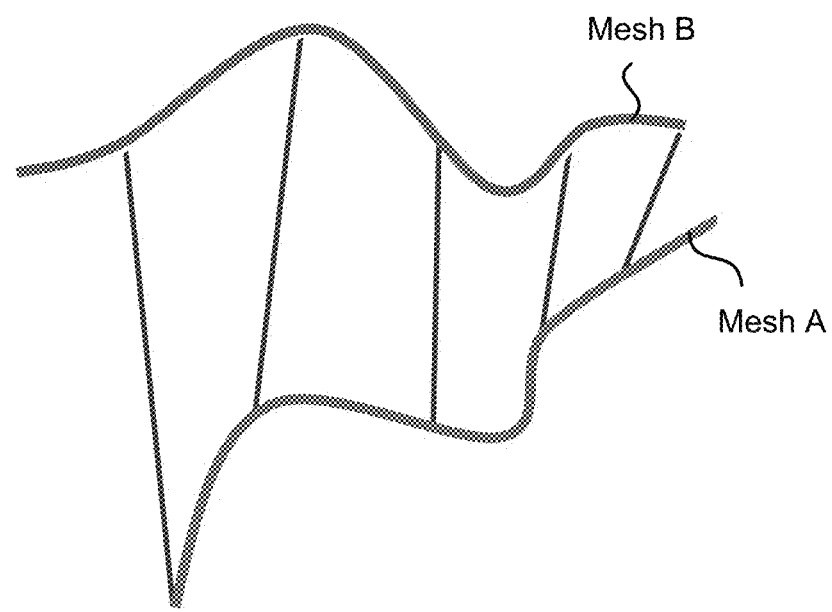
FIGS. 4A-4C are schematic drawings illustrating a spatial alignment procedure, according to one embodiment.

The method 300 can further include, for each respective vertex of mesh A $\{V_A\}$ within the bounding box, searching for a corresponding closest vertex in mesh B $\{V_B\}$ (308), thereby establishing one or more matching pairs. Each matching pair may include the respective vertex of mesh A and the corresponding closest vertex of mesh B, as illustrated schematically in FIG. 4A.

In some embodiments, the method 300 can further include removing false matching pairs from the one or more matching pairs (310). False matches may occur due to normal inconsistencies and spurious triangles. Unlike pure point clouds, mesh vertices may have normal vectors to indicate orientations of triangles adjacent the vertices. For example, a mesh vertex may be shared by a number of connected triangles, where each triangle may have a respective normal vector. A normal vector of the mesh vertex can be defined as the average of the normal vectors of the triangles sharing the vertex. A matching pair may be likely a false match if the normal vector of a vertex of mesh A $\{V_A\}$ is significantly different from the normal vector of a corresponding vertex in mesh B $\{V_B\}$. Therefore, according to some embodiments, the method 300 may exclude matching pairs whose normal vector differences between the matched vertices exceed a predetermined threshold. False matches may also occur due to spurious triangles. Spurious triangles are low quality triangles that may not represent real geometry well for various reasons. The detection of spurious triangles will be described in more detail below.

Figure 4B:
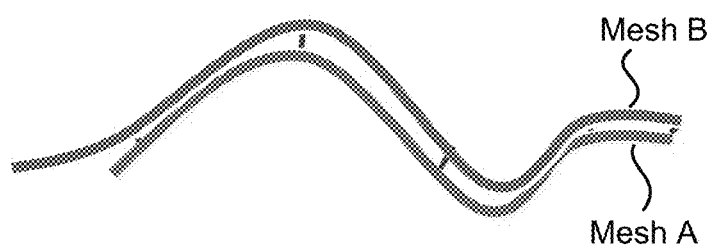

The method 300 can further include determining a rigid transformation to be applied to mesh A so as to minimize the distances between each respective vertex of mesh A and the corresponding closest vertex of mesh B in each matching pair (312); and rotating and translating mesh A using the rigid transformation (314). FIG. 4B illustrates schematically mesh A and mesh B after a rigid transformation has been applied.

Figure 4C:
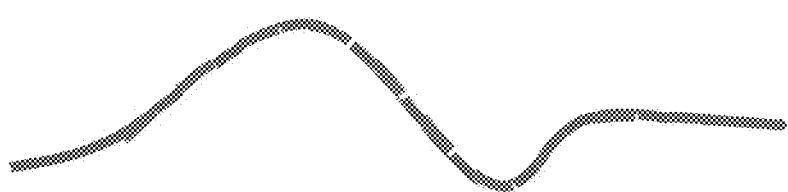

The steps 308, 310, and 312 may be iterated for a number of times until convergence is reached. It can be determined that convergence has been reached when an error is below a predetermined threshold value, where the error can be defined as a sum of distances between each respective vertex of mesh A and the corresponding closest vertex of mesh B. FIG. 4C illustrates schematically mesh A and mesh B after convergence is reached.

Figure 5:
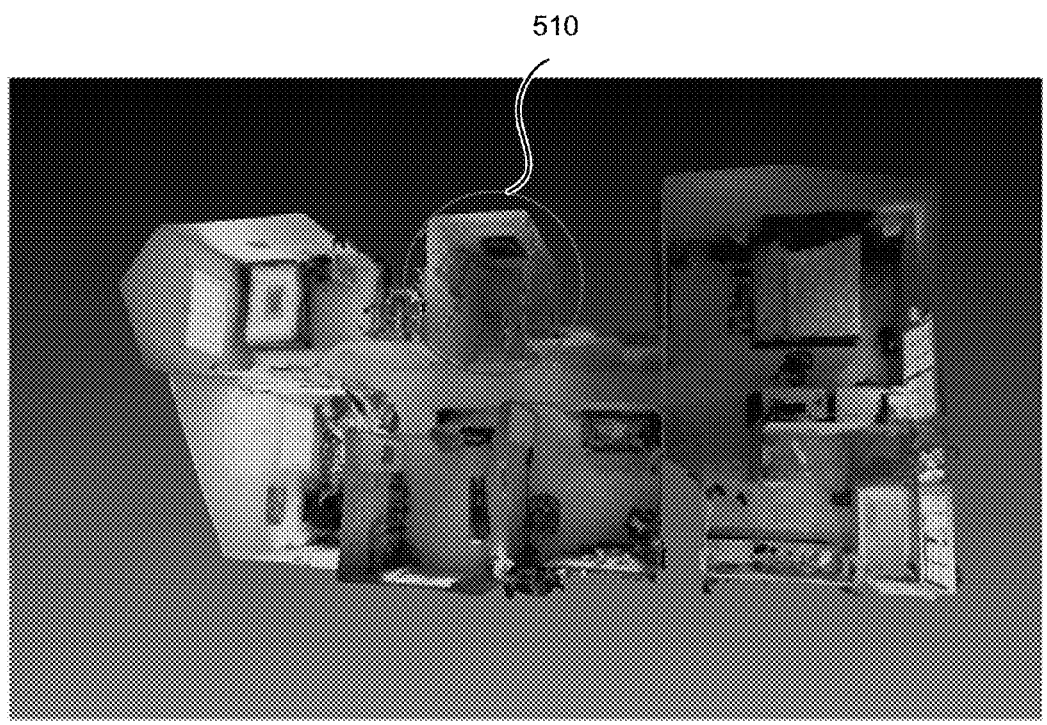
FIG. 5 illustrates images of the two meshes illustrated in FIG. 2 after a spatial alignment procedure according to an embodiment of the present invention.

FIG. 5 illustrates images of the two meshes illustrated in FIG. 2 after the spatial alignment procedure according to one embodiment. As illustrated, the two meshes are now aligned properly with respect to each other in the overlapping region 510.

B. Spurious Triangle Detection

Meshes generated from 3D scanning can contain some low quality triangles that do not represent the real geometry well for a variety of reasons, such as an insufficient capture, inappropriate lighting, extreme view angles, and the like. These low quality triangles, which may be referred to as spurious triangle, may potentially lead an ICP algorithm to converge to an incorrect transformation. Therefore, it may be advantageous to remove false matching pairs resulted from spurious triangles before applying the ICP algorithm. Detecting spurious triangles may be challenging for several reasons. For example, a mesh may often include areas having arbitrary shapes, complex topologies, and varying locations and orientations. In addition, it may be difficult to differentiate spurious triangles from good quality triangles that encode real geometry details.

According to some embodiments, a method of detecting spurious triangles may involve comparing nearby regions of two meshes to identify spurious regions that include relatively small, normal consistent patches. For a given vertex in a mesh, its "normal consistent connected group" (NCNG) may be defined as a group of edge-connected triangles whose normal vectors are similar to a normal vector of the given vertex. In other words, an NCNG of a given vertex may be a mesh patch that contains the given vertex and has small variations among the normal vectors of the triangles in the mesh patch. Thus, the term "normal consistent" refers to a consistent direction along which a normal vector of one vertex and a normal vector of another vertex are directed. In general, triangles having relatively small NCNGs may have a higher likelihood of being spurious. However, simply taking all triangles having small NCNGs as spurious may yield false positives, as a highly detailed object may also contain many small NCNGs. For example, a chandelier may have many tiny NCNGs that may be falsely classified as spurious. Therefore, according to an embodiment, an NCNG of a vertex in mesh A is compared with an NCNG of a corresponding vertex in mesh B in order to detect a spurious triangle. If the NCNG of the vertex in mesh B has an area that is significantly smaller than the NCNG of the corresponding vertex in mesh A, it may be highly likely that the vertex in mesh B belongs to a spurious triangle. Similarly, if the NCNG of the vertex in mesh A has an area that is significantly smaller than the NCNG of the corresponding vertex in mesh B, it may be highly likely that the vertex in mesh A belongs to a spurious triangle. According to some embodiments, if the ratio between an area of an NCNG of a vertex in mesh A and an area of an NCNG of a corresponding vertex in mesh B is greater than a predetermined threshold, the vertex pair can be classified as a false match. This predetermined threshold may vary depending on the particular application, for example, between 2 and 10. One of ordinary skill in the art would recognize many variations, modifications, and alternatives.

Figure 6:
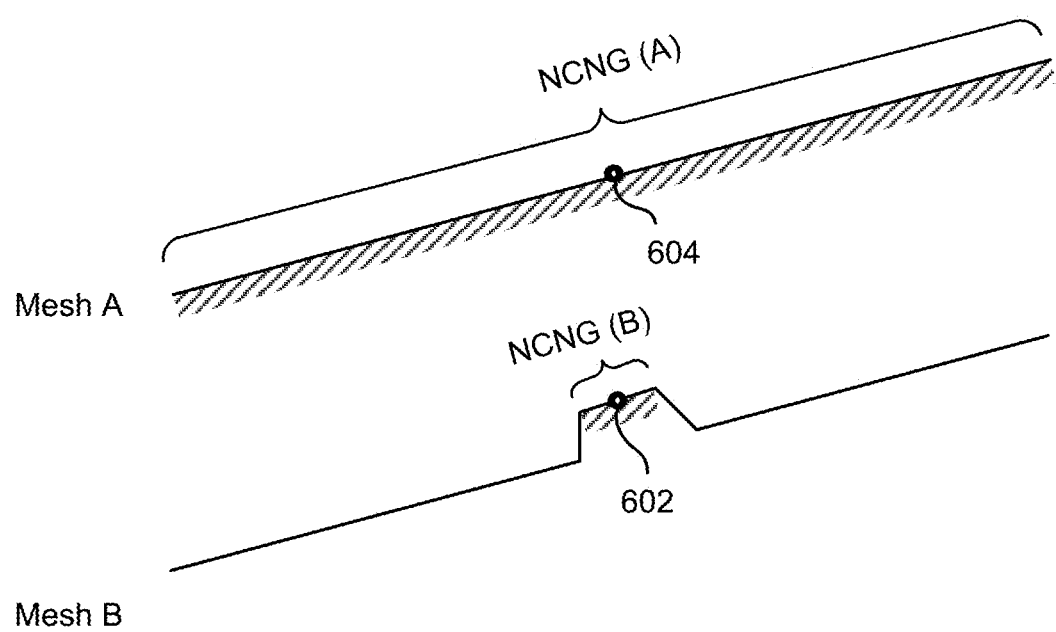
FIG. 6 is a schematic drawing illustrating an example where a false match between two meshes may be detected, according to one embodiment.

FIG. 6 is a schematic drawing illustrating an example where a false match may be detected according to one embodiment. In this example, a real geometry of an environment is a plane, which is consistent with mesh A. For a given vertex 604 in mesh A, an NCNG of that vertex NCNG (A) may be the entire plane. In contrast, mesh B includes a small bump around a vertex 602. Thus, the NCNG of the vertex 602 NCNG (B) may have a much smaller area. Therefore, it may be determined that the vertex 602 belongs to a spurious triangle and that the vertex pair 604 and 602 is a false match.

One approach of detecting spurious triangles may include searching for the NCNG for each vertex that has been matched by the ICP algorithm. However, the computational cost of such an approach can be very high, because a densified mesh region may have a large number of vertices. According to some embodiments, an algorithm may be configured to estimate the NCNGs of all vertices based on a normal sampling. Rather than searching for NCNGs using every vertex' normal, this algorithm may sample the normal directions at every x degrees as an approximation, where x may be 5 degrees, 10 degrees, and the like. In some embodiments, the normal sampling may be done in spherical coordinates including polar angles and azimuthal angles, thereby producing (360/x*180/x) number of sampled normals, which can be significantly less than the total number of normals for all vertices.

A normal-sampling algorithm may have a linear time complexity of $O(s*n)$, where s is the number of sampled directions and n is the number of all vertices. In contrast, a per-vertex algorithm may have a linear time complexity of $O(n^2)$. Therefore, the normal-sampling algorithm may be significantly more efficient than the per-vertex algorithm, since s can be significantly less than n. Moreover, because sampling in various directions are independent from each other, the normal-sampling algorithm may run the samples in parallel. In some embodiments, a parallel algorithm may be implemented on a multi-core central processing unit (CPU) or graphics processing unit (GPU), which may further improve the efficiency of spurious triangle detection.

C. Mesh Clipping

After two meshes are aligned with respect to each other in 3D space, some mesh vertices in overlapping regions may be redundant since they may be captured by both meshes. According to some embodiments, the redundant vertices may be clipped off (i.e., removed). It may be advantageous to clip off the redundant vertices for several reasons. For example, the redundant mesh triangles may have different geometries and textures with respect to one another, and thus may potentially be shown as apparent artifacts if not clipped. In addition, regions adjacent the allowable scanning range may have inaccurate geometries and textures. Thus, it may be advantageous to clip off the vertices in those regions.

Figure 7A:
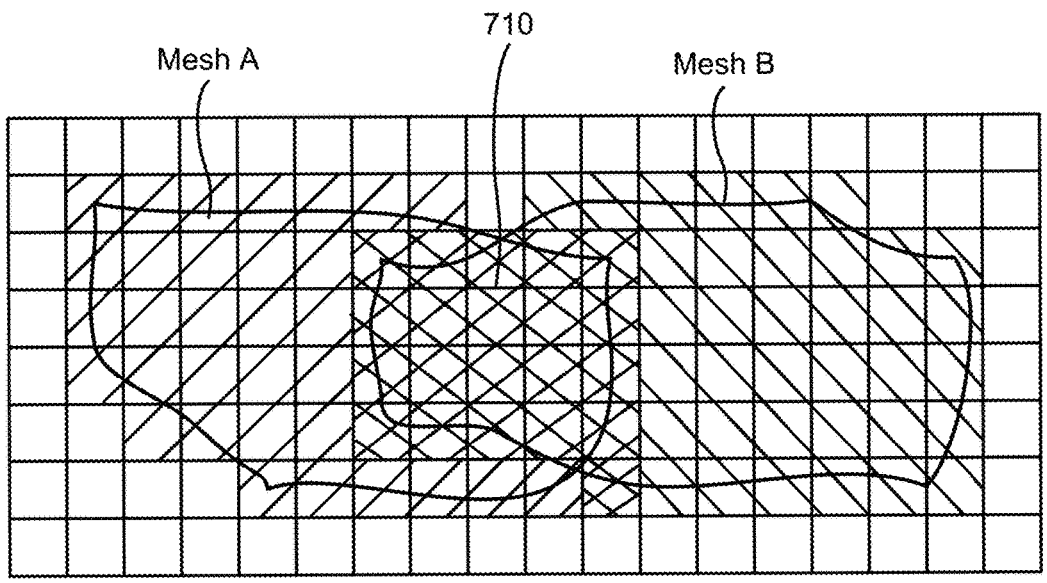
FIG. 7A is a schematic drawing illustrating a two-dimensional view of an exemplary grid of voxels in which a mesh clipping procedure can be applied to two meshes, according to some embodiments.

According to some embodiments, mesh clipping may be performed by an automatic energy minimization procedure. In this procedure, a bounding box of the mesh overlapping regions may be considered as a clipping volume. The clipping volume may then be rasterized as a grid of voxels: V. FIG. 7A is a schematic drawings illustrating a two-dimensional view of an exemplary grid of voxels in which a mesh clipping procedure may be applied to two meshes, mesh A and mesh B, according to some embodiments. Each square in the grid represents a voxel. As illustrated, the two meshes overlap in region 710.

In an automatic energy minimization procedure, mesh clipping may be formulated as a voxel-labeling problem. A binary label $f_v$ may be assigned to each voxel v to classify it as either mesh A voxel or mesh B voxel, as follows:

$f_v=0$; v is a mesh A voxel; $f_v=1$; v is a mesh B voxel.

A mesh vertex may be clipped off when it is in a voxel labeled as the other mesh.

In some embodiments, the goal may be to find labeling $f_v$ for every v that minimizes the following energy function:

$$E(f)=\Sigma_{v\in V}(D(f_v)+B(f_v))+\Sigma_{v_i,v_j\in N}(H(f_{vi},f_{vj})+T(f_{vi},f_{vj})) \quad (1);$$

where $N \subset V \times V$ is a $N_6$ neighborhood system of voxels. Each voxel may be pre-classified to one of four sets of voxels depending on how the voxel intersects the meshes: $V_a$ is a set of voxels that intersect with only mesh A; $V_b$ is a set of voxels that intersect with only mesh B; $V_s$, is a set of voxels that intersect with both mesh A and mesh B; $V_e$ is a set of voxels that intersect with neither mesh A nor mesh B. For instance, in the example illustrated in FIG. 7A, the voxels filled with left-slanted line hatchings are pre-classified as $V_a$ voxels; the voxels filled with right-slanted line hatchings are pre-classified as $V_b$ voxels, the voxels filled with cross hatchings are pre-classified as $V_s$ voxels, and the white voxels are pre-classified as $V_e$ voxels.

In the above equation, the term $D(f_v)$ may be referred to as a data term. The data term $D(f_v)$ may be designed to enforce prior knowledge of the voxels with known labels. Since it may be preferable to preserve the non-intersection regions in the clipping process, the data term $D(f_v)$ can be constructed to penalize a label $f_v$ if v is in a non-intersection region and the label $f_v$ contradicts with a known label for the voxel. As an example, the data term $D(f_v)$ may be defined as follows:

$$D(f_v) = \{c_d | (f_v = 0, v \in V_b) \| (f_v = 1, v \in V_a); 0 | \text{otherwise}\} \quad (2)$$

where $c_d$ is a positive cost value. In other words, assigning a label to a voxel in a non-intersection region that contradicts with a known label for the voxel may incur a positive "cost" $c_d$.

The term $B(f_v)$ may be referred to as a boundary term. Mesh triangles near the boundary of a mesh may have low qualities because they may be close to a scanning range limit of a scanner and may lack capture views. Therefore, it may be advantageous to clip off vertices in boundary areas of each mesh. The boundary term $B(f_v)$ may be constructed to assign gradually-increasing energies to voxels approaching a mesh boundary. As an example, the boundary term may be defined as follows:

$$B(f_v) = \left\{ c_{min} + \frac{(c_{max} - c_{min})(d_{max} - d_v)}{d_{max}} \right. \quad (3)$$

$$|(f_v = 0, v \in B_a)| \, |(f_v = 0, v \in B_b); 0 | \text{otherwise} \right\};$$

$$B_a = \{v \mid v \in V_a, d_v < d_{max}\}; \quad (4)$$

$$B_b = \{v \mid v \in V_b, d_v < d_{max}\}; \quad (5)$$

where $d_v$ is a geodesic distance from voxel $v$ to a mesh boundary along a mesh surface; $c_{min}$ and $c_{max}$ are positive constants representing a minimum boundary "cost" and a maximum boundary "cost," respectively; and $d_{max}$ is a maximum geodesic distance for a voxel to be considered as in a mesh boundary area.

The term $H(f_{vi}, f_{vj})$ may be referred to as an intersection term. It may be advantageous to place a cutting seam within regions where voxels intersect with both meshes. Therefore, the intersection term $H(f_{vi}, f_{vj})$ may be constructed to assign a much lower energy to voxels $V_s$ so that their cumulative energy is still lower than one voxel in $V_a$ or $V_b$. In addition, the empty voxels in $V_e$ may be assigned even lower energy to ensure that their cumulative energy is still lower than a voxel in $V_s$. As an example, the intersection term $H(f_{vi}, f_{vj})$ may be defined as follows:

$$H(f_{vi}, f_{vj}) = \min(I(f_{vi}, f_{vj}), I(f_{vj}, f_{vi})) \quad (6);$$

$$I(f_{vi}, f_{vj}) = \{c_d / 10k | (f_{vi}! = f_{vj}, v_i \in V_s); c_d / 100nk | (f_{vi}! = f_{vj}, v_i \in V_e)\} \quad (7)$$

where n is the total number of voxels and k is number of voxels in $V_s$.

The term $T(f_{vi}, f_{vj})$ may be referred to as a texture term. It may be advantageous to avoid ruining or interfering with color features of the meshes in the mesh clipping process. Therefore, the areas to be cut may be mesh areas where little color features are presented. For example, for a mesh representing an indoor room, cutting on a mesh area representing a white wall may produce a much smoother color transition than cutting on a mesh area representing a colorful mural. According to some embodiments, the texture term $T(f_{vi}, f_{vj})$ may be constructed to penalize clipping on areas with discernable color features. As an example, the texture term $(f_{vi}, f_{vj})$ may be defined as follows:

$$T(f_{vi}, f_{vj}) = \min(C(f_{vi}, f_{vj}), C(f_{vj}, f_{vi})) \quad (8);$$

$$C(f_{vi}, f_{vj}) = \{c_i / 40k | (f_{vi}! = f_{vj}, v_i \in V_s)\} \quad (9);$$

where $c_i$ is a standard deviation of texture patch color centered at voxel $v_i$; and k is a number of voxels in $V_s$.

According to some embodiments, the energy minimization problem may be solved using discrete optimization algorithms, such as graph cut and the like.

Figure 7B:
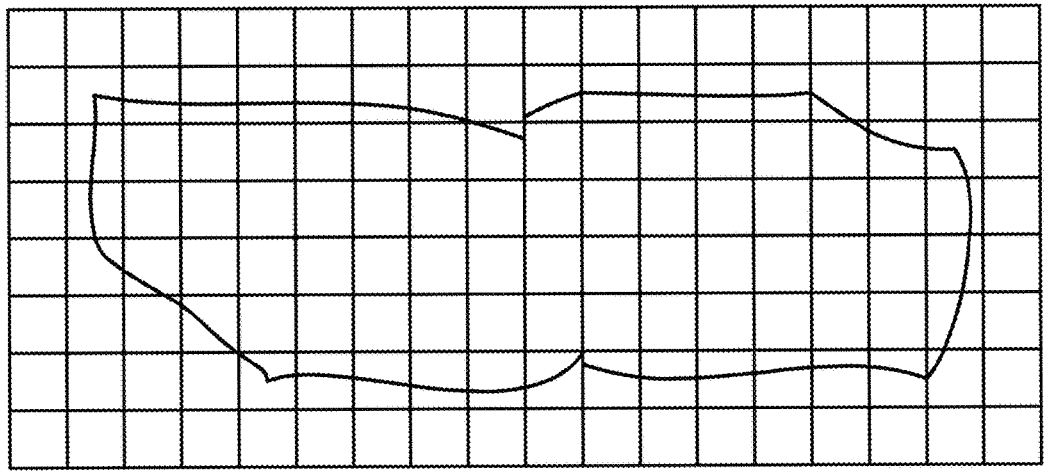
FIG. 7B is a schematic drawing illustrating the two meshes as illustrated in FIG. 7A after a mesh clipping procedure has been performed, according to one embodiment.

FIG. 7B is a schematic drawing illustrating the two meshes, mesh A and mesh B, as illustrated in FIG. 7A after a mesh clipping procedure has been performed, according to one embodiment.

Figure 8A:
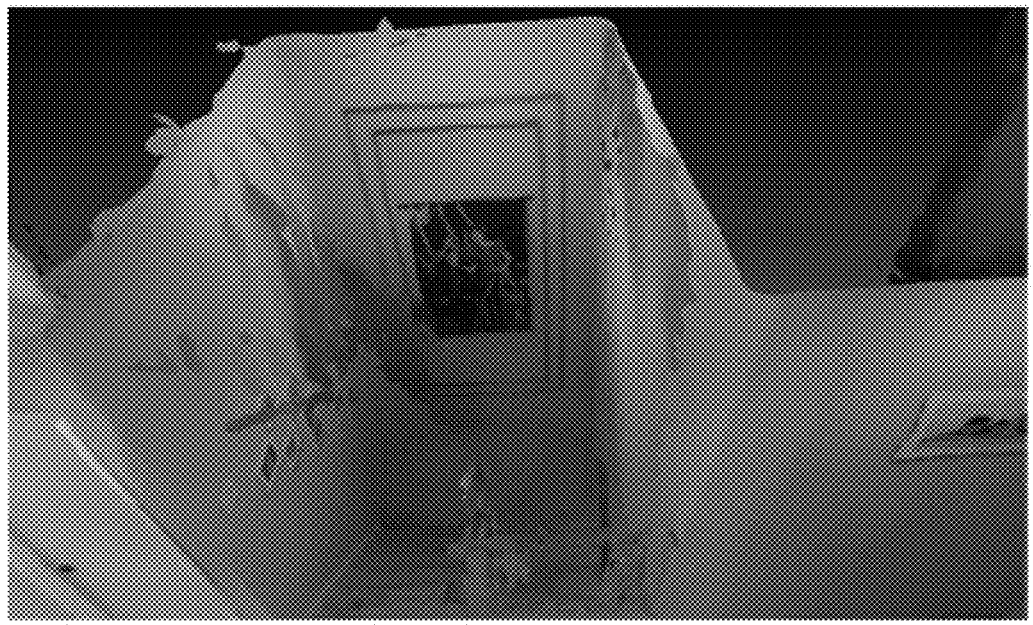
FIGS. 8A and 8B are images of an overlapping region of the two meshes illustrated in FIG. 5 before and after a mesh clipping procedure, respectively, according to one embodiment.
Figure 8B:
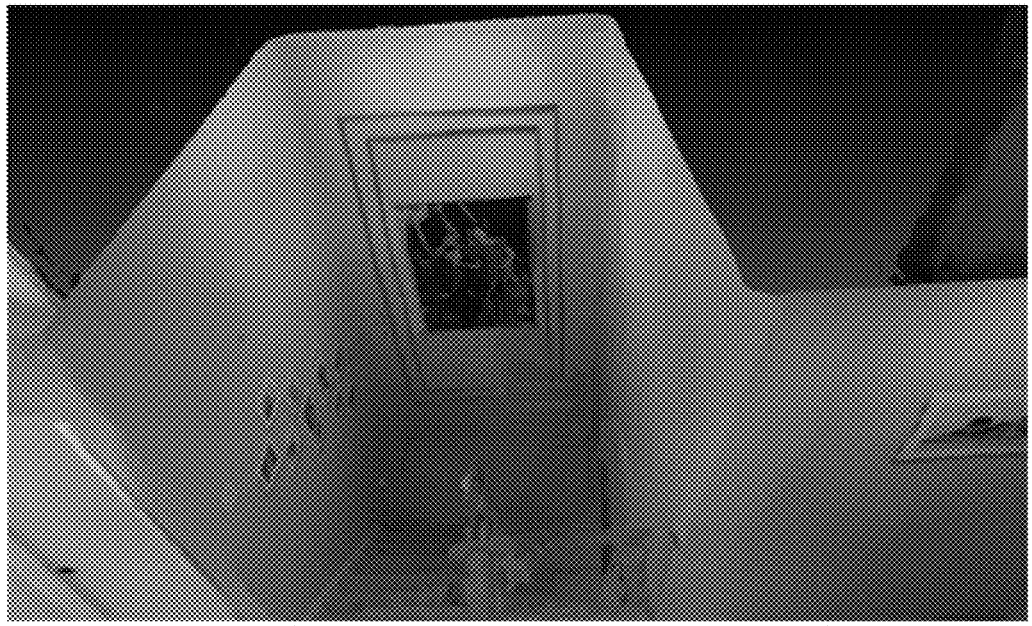

FIGS. 8A and 8B are images the overlapping region 510 of the two meshes illustrated in FIG. 5 (i.e. the regions of the two meshes that represent a staircase of the house) before and after a mesh clipping procedure, respectively, according to one embodiment.

D. Geometry Refinement

After a mesh clipping procedure, two meshes may be merged to form a single merged mesh. To make the merged mesh appear as seamless as possible, it may be advantageous to adjust the merged mesh around a clipping boundary to improve both the geometry and texture around a clipping seam.

Figure 9A:
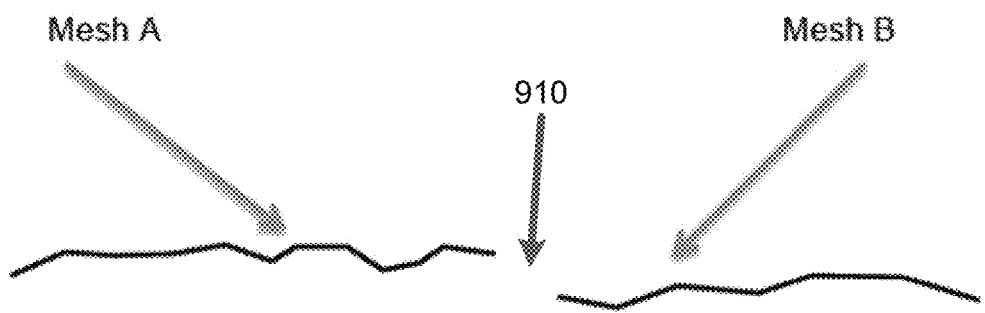
FIGS. 9A and 9B illustrate a geometry refinement procedure, according to one embodiment.
Figure 9B:
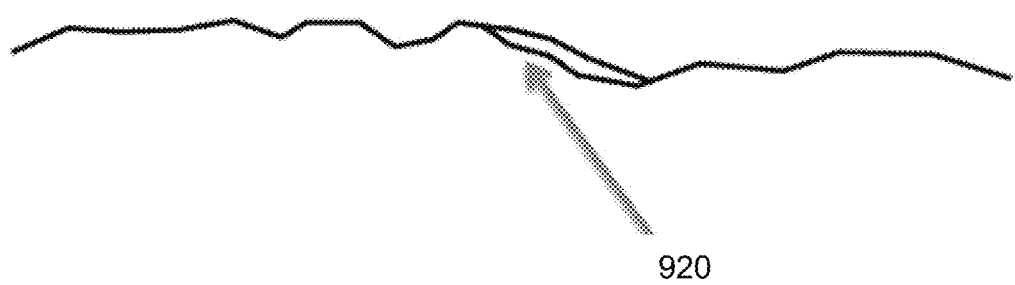

According to some embodiments, a geometry refinement process may aim to close up mesh concatenation holes while minimizing local geometry changes. FIG. 9A illustrates an exemplary image of two meshes, mesh A and mesh B, after a mesh clipping procedure. As illustrated, there is a clipping hole 910 along a clipping seam. To obtain a seamless transition, a geometry refinement process may grow back the two meshes along the clipping seam by a small extension. This growing process may produce a small merging band 920 between mesh A and mesh B, as illustrated in FIG. 9B. Note that a mesh clipping procedure may have already trimmed out large areas of redundant mesh triangles. The growing process may take back a small portion of the clipped area so that there may be a small merging band around the clipping seam.

After the geometry refinement process, the merged mesh may be continuous (i.e., appear watertight). Therefore, the corresponding overlapping regions may be bent towards each other to reduce the interspace in-between. In some embodiments, each vertex in mesh A may be translated towards a matching vertex in mesh B, which may be found in the spatial alignment step. Since the geometry refinement process may introduce only minimal geometry changes, larger translations may be applied to the vertices near the mesh boundary to close up the holes, while smaller translations can be applied to vertices farther away from the mesh boundary. In some embodiments, a translation from each vertex $v_0$ to a matching vertex $v_1$ may be applied as follows:

$$P_{v0} = P_{v0} + w(P_{v1} - P_{v0}); \quad (10)$$

$$w = \frac{d_{bmax} - d_0}{d_{bmax}}; \quad (11)$$

where $P_{v0}$ and $P_{v1}$ are positions of matched vertices $v_0$ and $v_1$, respectively; $d_{bmax}$ is the largest geodesic distance to a mesh boundary within a merging area; and $d_0$ is the geodesic distance from $v_0$ to the mesh boundary. w may be considered as a weight factor that depends on the geodesic distance of a vertex from the mesh boundary.

E. Texture Blending

Two meshes in the merging areas after a mesh clipping procedure may not have the same textures, for example, because of different lightings as seen from different angles.

Figure 10A:
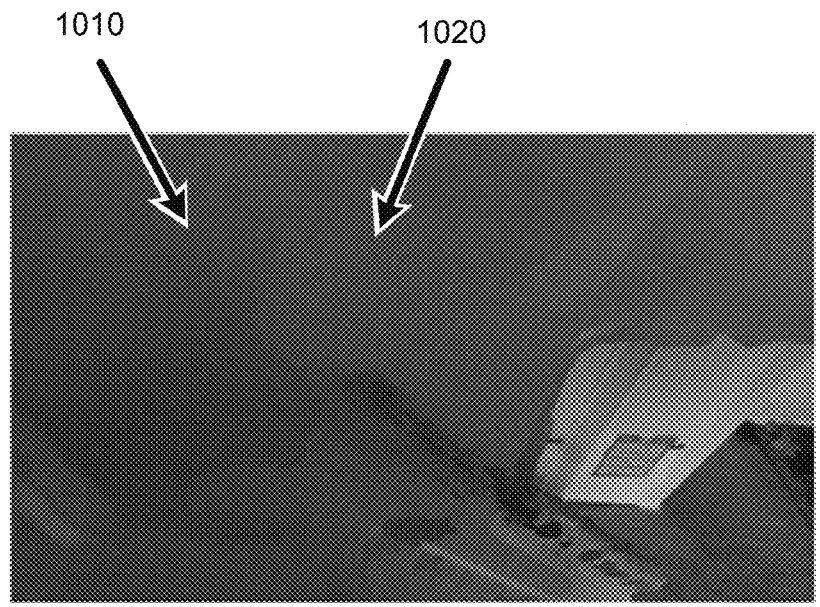
FIGS. 10A and 10B illustrate exemplary images of a merged mesh near a merging area before and after a texture blending process, respectively, according to one embodiment.

FIG. 10A illustrates an exemplary image of a merged mesh near a merging area. Colors in a first area 1010 and a second area 1020 within the merging area are different. To produce smoother color transitions, it may be helpful to blend the textures within the merging areas.

Figure 10B:
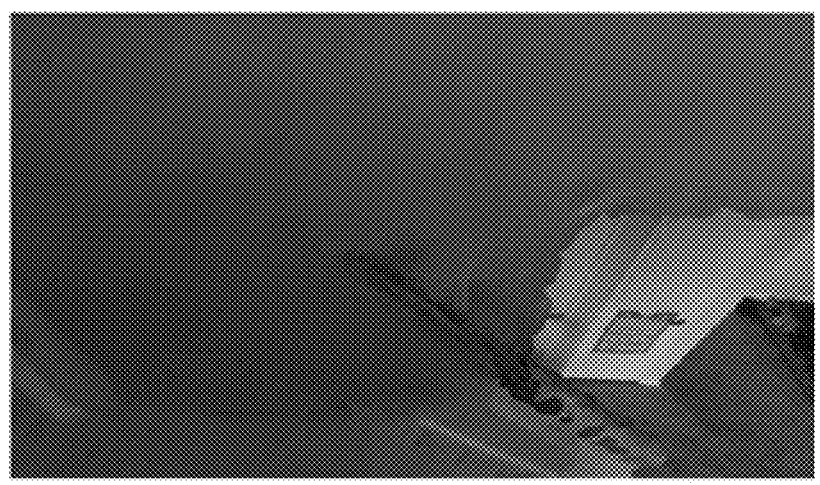

In some embodiments, a texel (i.e., texture element or texture pixel) correspondence between mesh A and mesh B may be established by finding the closest points. As the number of texels may be very large, a k-d tree data structure may be used to speed up the closest neighbor search. A blending weight may be similar to the weight w used in the geometry refinement process as described above. Such a texture blending procedure may result in a gradual color change from one mesh to the other while approaching the boundaries. In some embodiments, the textures in the transition areas may be rasterized as texels and blended into the texel colors. According to one embodiment, texel blending weights may be computed using barycentric interpolation of triangle weights w from the geometry refinement process. FIG. 10B illustrates an exemplary image of the merged mesh illustrated in FIG. 10A after a texture blending process according to one embodiment.

Figure 11:
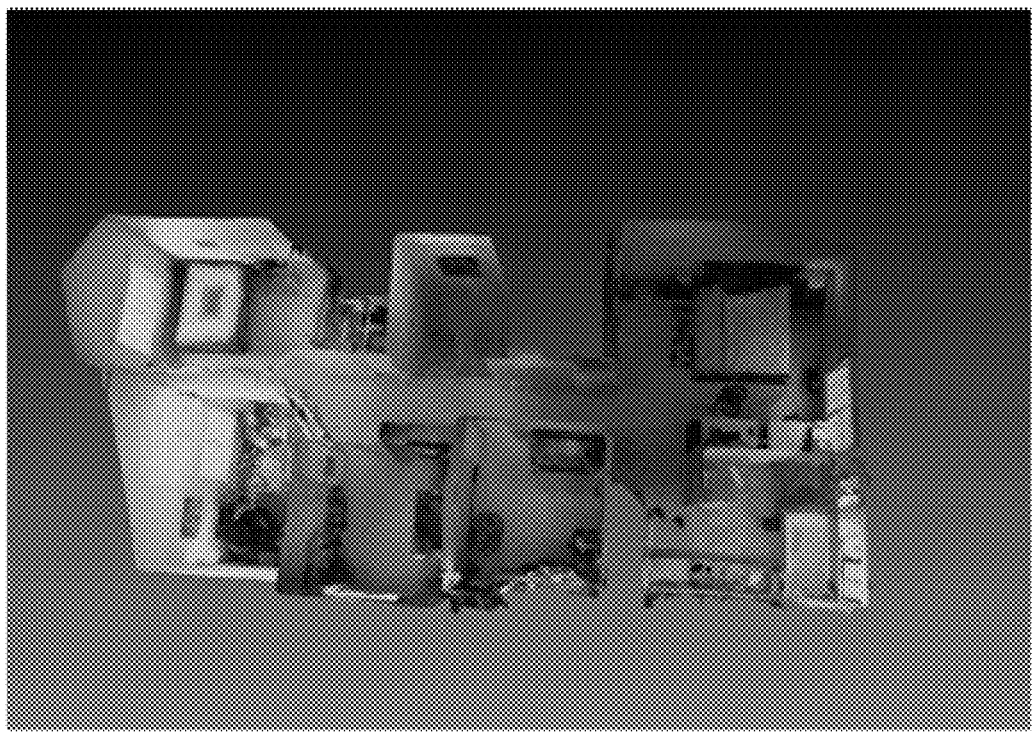
FIG. 11 illustrates an image of a merged mesh resulted from merging the two meshes illustrated in FIG. 2 using a mesh merging algorithm, according to one embodiment.

FIG. 11 illustrates an image of a merged mesh resulted from merging the two meshes illustrated in FIG. 2 using a mesh merging algorithm, according to one embodiment.

Figure 12:
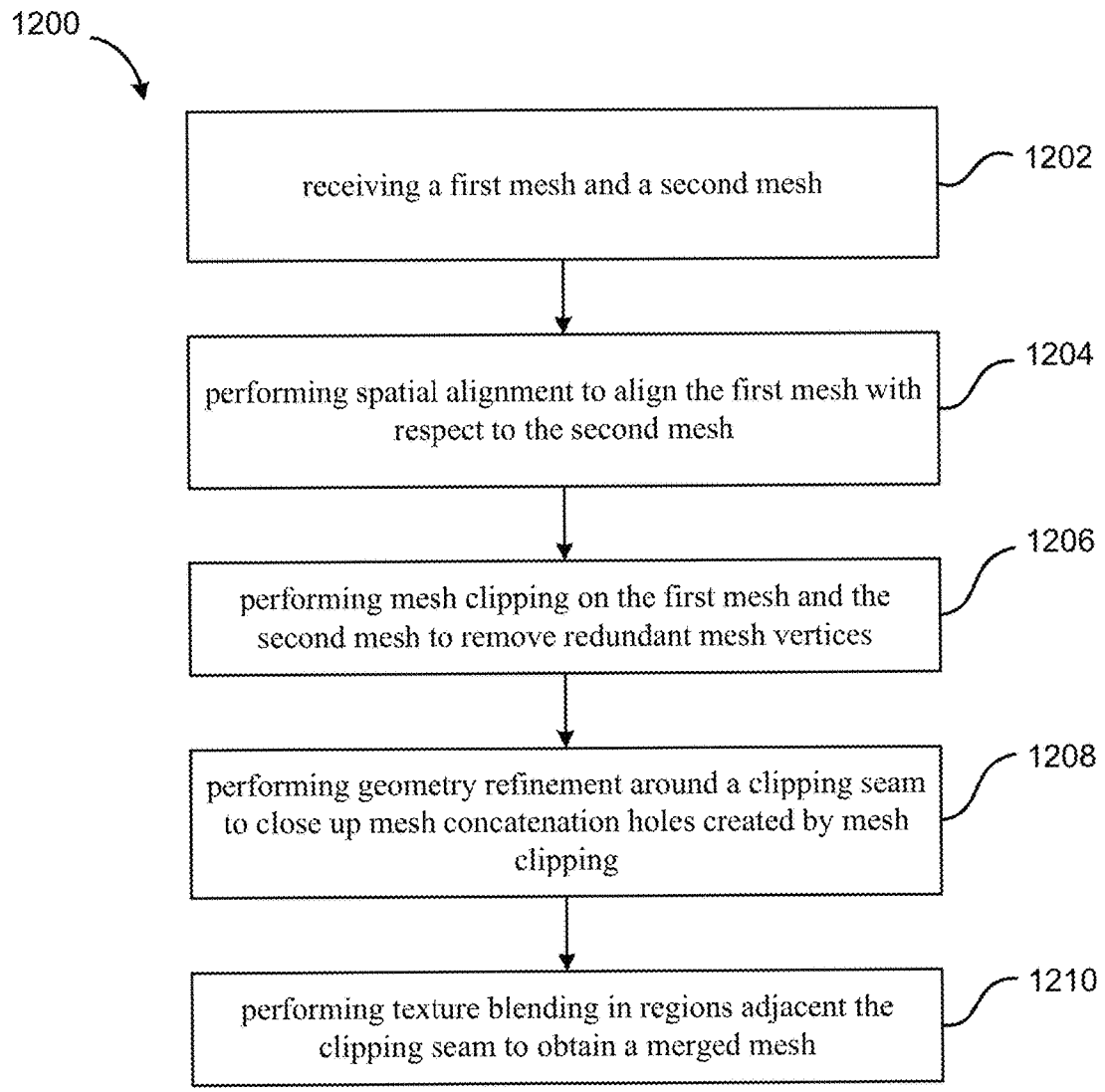
FIG. 12 is a flowchart illustrating a method of merging 3D meshes, according to one embodiment.

FIG. 12 is a flowchart illustrating a method 1200 of merging 3D meshes, according to one embodiment. The method 1200 may include receiving a first mesh and a second mesh (1202); performing spatial alignment to align the first mesh with respect to the second mesh (1204); performing mesh clipping on the first mesh and the second mesh to remove redundant mesh vertices (1206); performing geometry refinement around a clipping seam to close up mesh concatenation holes created by mesh clipping (1208); and performing texture blending in regions adjacent the clipping seam to obtain a merged mesh (1210).

Figure 13:
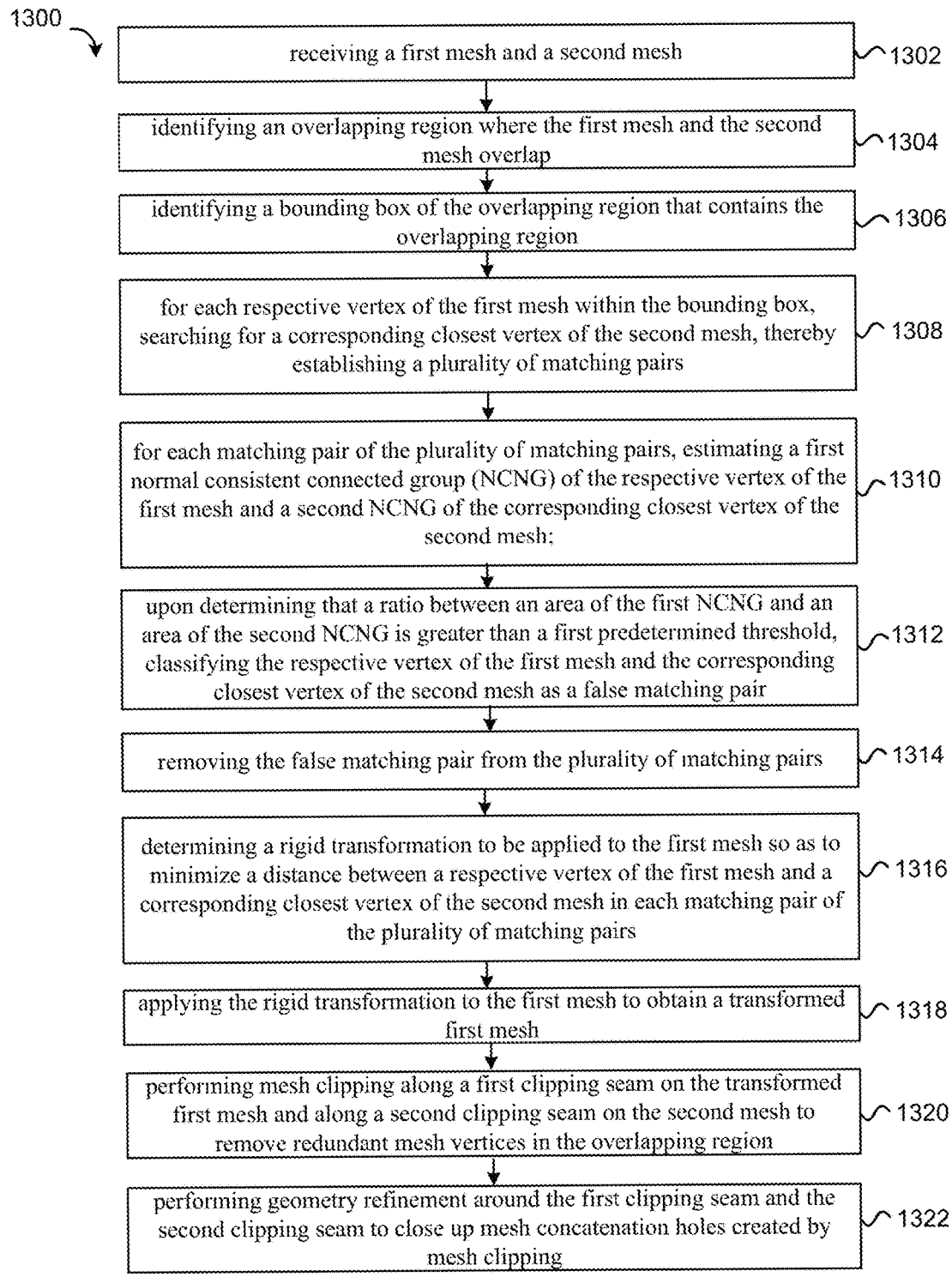
FIG. 13 is a flowchart illustrating a method of merging 3D meshes, according to one embodiment.

FIG. 13 is a flowchart illustrating a method 1300 of merging 3D textured meshes, according to one embodiment. The method 1300 includes receiving a first mesh and a second mesh (1302). The method 1300 may further include identifying an overlapping region where the first mesh and the second mesh overlap (1304); identifying a bounding box of the overlapping region that contains the overlapping region (1306); and for each respective vertex of the first mesh within the bounding box, searching for a corresponding closest vertex of the second mesh, thereby establishing a plurality of matching pairs (1308). Each matching pair includes the respective vertex of the first mesh and the corresponding closest vertex of the second mesh.

The method 1300 may further include removing one or more false matching pairs by, for each matching pair of the plurality of matching pairs: estimating a first normal consistent connected group (NCNG) of the respective vertex of the first mesh and a second NCNG of the corresponding closest vertex of the second mesh (1310); upon determining that a ratio between an area of the first NCNG and an area of the second NCNG is greater than a first predetermined threshold, classifying the respective vertex of the first mesh and the corresponding closest vertex of the second mesh as a false matching pair (1312); and removing the false matching pair from the plurality of matching pairs (1314).

The method 1300 may further include determining a rigid transformation to be applied to the first mesh so as to minimize a distance between a respective vertex of the first mesh and a corresponding closest vertex of the second mesh in each matching pair of the plurality of matching pairs (1316); and applying the rigid transformation to the first mesh to obtain a transformed first mesh (1318). The method 1300 may further include performing mesh clipping along a first clipping seam on the transformed first mesh and along a second clipping seam on the second mesh to remove redundant mesh vertices in the overlapping region (1320); and performing geometry refinement around the first clipping seam and the second clipping seam to close up mesh concatenation holes created by mesh clipping (1322).

It should be appreciated that the specific steps illustrated in each of FIGS. 12 and 13 provide particular methods according to some embodiments of the disclosure. Other sequences of steps may also be performed according to alternative embodiments. For example, alternative embodiments of the present disclosure may perform the steps outlined above in a different order. Moreover, the individual steps illustrated in each of FIGS. 12 and 13 may include multiple sub-steps that may be performed in various sequences as appropriate to the individual step. Furthermore, steps may be added or removed depending on the particular applications. One of ordinary skill in the art would recognize many variations, modifications, and alternatives.

While various embodiments of the disclosure have been described above, it should be understood that they have been presented by way of example only, and not by way of limitation. Likewise, the various diagrams may depict an example architectural or other configuration for the disclosure, which is done to aid in understanding the features and functionality that may be included in the disclosure. The disclosure is not restricted to the illustrated example architectures or configurations, but may be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

Various exemplary logic blocks, modules, circuits, and algorithm steps described with reference to the disclosure herein may be implemented as electronic hardware, computer software, or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present disclosure. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually may be executed in parallel substantially, and sometimes, they may also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

Embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer-readable storage media (including but not limited to a magnetic disk memory, a CD-ROM, an optical memory and so on) containing computer-readable program codes.

Embodiments of the present disclosure are described with reference to flow diagrams and/or block diagrams of methods, devices (systems), and computer program products. It will be understood that each flow and/or block of the flow diagrams and/or block diagrams, and combinations of flows and/or blocks in the flow diagrams and/or block diagrams, may be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable storage medium includes non-volatile and volatile media, and removable and non-removable media, wherein information storage can be implemented with any method or technology. Information may be modules of computer-readable instructions, data structures and programs, or other data. Examples of a computer-storage medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, or any other non-transmission media that may be used to store information capable of being accessed by a computer device. The computer-readable storage medium is non-transitory, and does not include transitory media, such as modulated data signals and carrier waves.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

What is claimed is:

1. A method of merging three-dimensional (3D) meshes, the method comprising:
   receiving a first mesh and a second mesh;
   performing spatial alignment to register the first mesh with respect to the second mesh by:
   identifying an overlapping region where the first mesh and the second mesh overlap;
   identifying a bounding box of the overlapping region that contains the overlapping region;
   for each respective vertex of the first mesh within the bounding box, searching for a corresponding closest vertex of the second mesh, thereby establishing a plurality of matching pairs, each matching pair comprising the respective vertex of the first mesh and the corresponding closest vertex of the second mesh;
   removing one or more false matching pairs by, for each matching pair of the plurality of matching pairs:
   estimating a first normal consistent connected group (NCNG) of the respective vertex of the first mesh and a second NCNG of the corresponding closest vertex of the second mesh;

upon determining that a ratio between an area of the first NCNG and an area of the second NCNG is greater than a first predetermined threshold, classifying the respective vertex of the first mesh and the corresponding closest vertex of the second mesh as a false matching pair; and removing the false matching pair from the plurality of matching pairs;

determining a rigid transformation to be applied to the first mesh so as to minimize a distance between a respective vertex of the first mesh and a corresponding closest vertex of the second mesh in each matching pair of the plurality of matching pairs; and applying the rigid transformation to the first mesh to obtain a transformed first mesh;

performing mesh clipping along a first clipping seam on the transformed first mesh and along a second clipping seam on the second mesh to remove redundant mesh vertices in the overlapping region; and performing geometry refinement around the first clipping seam and the second clipping seam to close up mesh concatenation holes created by mesh clipping.

2. The method of claim 1, further comprising:
performing texture blending in regions adjacent the clipping seam.

3. The method of claim 1, wherein performing spatial alignment further comprises, before determining the rigid transformation, for each matching pair of the plurality of matching pairs:
estimating a first normal vector of the respective vertex of the first mesh and a second normal vector of the corresponding closest vertex of the second mesh;
upon determining that a difference between the first normal vector and the second normal vector is greater than a second predetermined threshold, classifying the respective vertex of the first mesh and the corresponding closest vertex of the second mesh as a false matching pair; and
removing the false matching pair from the plurality of matching pairs.

4. The method of claim 1, wherein performing mesh clipping comprises:
rasterizing the bounding box of the overlapping region as a grid of voxels;
labeling each voxel in the grid of voxels as one of a first mesh voxel and a second mesh voxel by applying an energy minimization procedure using an energy function that includes a data term, a boundary term, an intersection term, and a texture term; and
clipping off each respective vertex of the first mesh when the respective vertex of the first mesh is in a voxel labeled as a second mesh voxel, and each respective vertex of the second mesh when the respective vertex of the second mesh is in a voxel labeled as a first mesh voxel.

5. The method of claim 1, further comprising performing texture blending of the first mesh and the second mesh by:
rasterizing the bounding box of the overlapping region as a grid of texels;
for each respective texel of the first mesh, identifying a corresponding texel of the second mesh; and
blending a texture of each respective texel of the first mesh with a texture of a corresponding texel of the second mesh using a blending weight that increases with decreasing distance from the respective texel to the clipping seam.

6. The method of claim 1, wherein removing one or more false matching pairs is performed by applying a normal vector sampling algorithm.

7. A method of merging three-dimensional (3D) textured meshes, the method comprising:
receiving a first mesh and a second mesh;
performing spatial alignment to align the first mesh with respect to the second mesh by:
identifying an overlapping region where the first mesh and the second mesh overlap;
for each respective vertex of the first mesh in the overlapping region, searching for a corresponding closest vertex in the second mesh, thereby establishing a plurality of matching pairs, each matching pair comprising the respective vertex of the first mesh and the corresponding closest vertex of the second mesh;
removing one or more false matching pairs from the plurality of matching pairs by:
identifying a first normal consistent connected group (NCNG) of the respective vertex of the first mesh and a second NCNG of the corresponding closest vertex of the second mesh; and
upon determining that a ratio between an area of the first NCNG and an area of the second NCNG is greater than a predetermined threshold, removing the respective vertex in the first mesh and the corresponding closest vertex in the second mesh from the plurality of matching pairs;
determining a rigid transformation to be applied to the first mesh so as to minimize distances between corresponding vertexes in remaining matching pairs of the plurality of matching pairs; and
rotating and translating the first mesh using the rigid transformation;
performing mesh clipping on the first mesh and the second mesh to remove redundant mesh vertices;
performing geometry refinement around a clipping seam to close up mesh concatenation holes created by mesh clipping; and
performing texture blending in regions adjacent the clipping seam to obtain a merged mesh.

8. The method of claim 7, wherein performing texture blending comprises:
identifying an overlapping region where the first mesh and the second mesh overlap;
identifying a bounding box of the overlapping region that contains the overlapping region;
rasterizing the bounding box of the overlapping region as a grid of texels;
for each respective texel of the first mesh, identifying a corresponding texel of the second mesh; and
blending a texture of each respective texel of the first mesh with a texture of a corresponding texel of the second mesh using a blending weight that increases with decreasing distance from the respective texel to the clipping seam.

9. The method of claim 7 wherein:
performing spatial alignment further comprises identifying a bounding box that contains the overlapping region, wherein each respective vertex of the first mesh and the corresponding closest vertex in the second mesh are within the bounding box;

the distances between corresponding vertexes comprises a distance between the respective vertex of the first mesh and the corresponding closest vertex of the second mesh; and removing one or more false matching pairs comprises classifying the respective vertex of the first mesh and the corresponding closest vertex of the second mesh as one of the one or more false matching pairs.

10. A method of merging three-dimensional (3D) textured meshes, the method comprising:
receiving a first mesh and a second mesh;
performing spatial alignment to align the first mesh with respect to the second mesh;
performing mesh clipping on the first mesh and the second mesh to remove redundant mesh vertices by:
identifying an overlapping region where the first mesh and the second mesh overlap;
identifying a bounding box of the overlapping region that contains the overlapping region;
rasterizing the bounding box of the overlapping region as a grid of voxels;
labeling each voxel in the grid of voxels as one of a first mesh voxel and a second mesh voxel by applying an energy minimization procedure using an energy function;
clipping off each respective vertex of the first mesh when the respective vertex of the first mesh is in a voxel labeled as a second mesh voxel; and
clipping off each respective vertex of the second mesh when the respective vertex of the second mesh is in a voxel labeled as a first mesh voxel; and
performing geometry refinement around a clipping seam to close up mesh concatenation holes created by mesh clipping.

11. The method of claim 10, wherein performing spatial alignment comprises:
identifying an overlapping region where the first mesh and the second mesh overlap;
identifying a bounding box of the overlapping region that contains the overlapping region;
for each respective vertex of the first mesh within the bounding box, searching for a corresponding closest vertex in the second mesh, thereby establishing a plurality of matching pairs, each matching pair comprising the respective vertex of the first mesh and the corresponding closest vertex of the second mesh;
removing one or more false matching pairs from the plurality of matching pairs;
determining a rigid transformation to be applied to the first mesh so as to minimize a distance between the respective vertex of the first mesh and the corresponding closest vertex of the second mesh in each matching pair of the plurality of matching pairs; and
rotating and translating the first mesh using the rigid transformation.

12. The method of claim 11, further comprising iterating the steps of, for each respective vertex of the first mesh within the bounding box, searching for a corresponding closest vertex of the second mesh, for each matching pair of the plurality of matching pairs, removing one or more false matching pairs, determining a rigid transformation, and rotating and translating the first mesh using the rigid transformation, for a number of times until convergence is reached.

13. The method of claim 11, wherein identifying the bounding box comprises:
identifying an initial bounding box containing the overlapping region; and
scaling the initial bounding box with a scaling factor to obtain the bounding box.

14. The method of claim 11, further comprising, before searching for the corresponding closest vertex of the second mesh, densifying mesh triangles inside the bounding box through an edge split to obtain densified vertices of the first mesh and the second mesh inside the bounding box.

15. The method of claim 11, wherein removing the one or more false matching pairs comprises:
estimating a first normal vector of the respective vertex of the first mesh and a second normal vector of the corresponding closest vertex of the second mesh;
upon determining that a difference between the first normal vector and the second normal vector is greater than a predetermined threshold, classifying the respective vertex of the first mesh and the corresponding closest vertex of the second mesh as a false matching pair; and
removing the respective vertex in the first mesh and the corresponding closest vertex in the second mesh from the plurality of matching pairs.

16. The method of claim 15 wherein:
estimating the first normal vector of the respective vertex of the first mesh comprises estimating an average of normal vectors of a first plurality of triangles sharing the respective vertex of the first mesh; and
estimating the second normal vector of the corresponding closest vertex of the second mesh comprises estimating an average of normal vectors of a second plurality of triangles sharing the corresponding closest vertex of the second mesh.

17. The method of claim 11, wherein removing the one or more false matching pairs comprises:
estimating a first normal consistent connected group (NCNG) of the respective vertex of the first mesh and a second NCNG of the corresponding closest vertex of the second mesh;
upon determining that a ratio between an area of the first NCNG and an area of the second NCNG is greater than a predetermined threshold, classifying the respective vertex in the first mesh and the corresponding closest vertex in the second mesh as one of the one or more false matching pairs; and
removing the respective vertex in the first mesh and the corresponding closest vertex in the second mesh from the plurality of matching pairs.

18. The method of claim 17, wherein removing the one or more false matching pairs is performed by applying a normal vector sampling algorithm.

19. The method of claim 10, wherein the energy function includes a data term that assigns a positive cost value for labeling a voxel as a first mesh voxel when the voxel intersects only the second mesh and for labeling a voxel as a second mesh voxel when the voxel intersects only the first mesh, and assigns a zero value otherwise.

20. The method of claim 10, wherein the energy function includes a boundary term that assigns an increasing positive cost value for labeling a voxel as a first mesh voxel for decreasing distance between the voxel and a boundary of the first mesh, and for labeling a voxel as a second mesh voxel for decreasing distance between the voxel and a boundary of the second mesh.

21. The method of claim 10, wherein the energy function includes an intersection term and a texture term, and wherein:

the intersection term assigns a lower cost value to voxels that intersect both the first mesh and the second mesh than to voxels that intersect only the first mesh or only the second mesh; and the texture term assigns a higher cost value to voxels having higher color variations than to voxels having lower color variations.

\* \* \* \* \*